US012570874B2

(12) United States Patent
Kitayama

(10) Patent No.: US 12,570,874 B2
(45) Date of Patent: Mar. 10, 2026

(54) GEL GASKET

(71) Applicants: NITTO, INC., Lakewood, NJ (US); NITTO DENKO CORPORATION, Osaka (JP)

(72) Inventor: Kazuhiro Kitayama, Lakewood, NJ (US)

(73) Assignees: Nitto, Inc., Teaneck, NJ (US); Nitto Denko Corporation, Osaka (JP)

( * ) Notice: Subject to any disclaimer, the term of this patent is extended or adjusted under 35 U.S.C. 154(b) by 0 days.

(21) Appl. No.: 17/049,351

(22) PCT Filed: Apr. 26, 2019

(86) PCT No.: PCT/US2019/029379
§ 371 (c)(1),
(2) Date: Oct. 21, 2020

(87) PCT Pub. No.: WO2019/210191
PCT Pub. Date: Oct. 31, 2019

(65) Prior Publication Data
US 2021/0253913 A1 Aug. 19, 2021

Related U.S. Application Data

(60) Provisional application No. 62/662,948, filed on Apr. 26, 2018.

(51) Int. Cl.

| | |
|---|---|
| *C09J 7/38* | (2018.01) |
| *C08K 5/523* | (2006.01) |
| *C09J 7/29* | (2018.01) |

(52) U.S. Cl.
CPC ................ *C09J 7/38* (2018.01); *C08K 5/523* (2013.01); *C09J 7/29* (2018.01); *C09J 2301/124* (2020.08);
(Continued)

(58) Field of Classification Search
None
See application file for complete search history.

(56) References Cited

U.S. PATENT DOCUMENTS

| | | | |
|---|---|---|---|
| 2004/0070156 | A1 | 4/2004 | Smith et al. |
| 2006/0199911 | A1 | 9/2006 | Markovich et al. |

(Continued)

FOREIGN PATENT DOCUMENTS

| | | | |
|---|---|---|---|
| CN | 103897619 | A | 7/2014 |
| EP | 1710279 | A1 | 10/2006 |

(Continued)

OTHER PUBLICATIONS

European search report for EP Patent Application No. 19791465.8 dated Jan. 4, 2022, 11 Pages.

(Continued)

*Primary Examiner* — Tamra L. Dicus
(74) *Attorney, Agent, or Firm* — Knobbe, Martens, Olson & Bear, LLP

(57) ABSTRACT

The present disclosure provides a gel gasket comprised, in part, of a pressure sensitive adhesive. The gel gasket is flame retardant and has anti-corrosive properties. In at least one embodiment, the gel gasket has a storage modulus of about 1,000 to about 25,000 Pa and the storage modulus is maintained after storage at 66° C./80% RH for at least 2 weeks.

11 Claims, 3 Drawing Sheets

(52) U.S. Cl.
CPC .... *C09J 2301/162* (2020.08); *C09J 2301/208* (2020.08); *C09J 2301/408* (2020.08); *C09J 2427/006* (2013.01); *C09J 2471/00* (2013.01)

(56) References Cited

U.S. PATENT DOCUMENTS

| | | | | |
|---|---|---|---|---|
| 2007/0208108 | A1* | 9/2007 | Wakabayashi | C08K 5/09 524/556 |
| 2009/0186993 | A1 | 7/2009 | Noro et al. | |
| 2009/0234072 | A1* | 9/2009 | Nakagawa | C08G 77/16 525/100 |
| 2011/0070434 | A1 | 3/2011 | Hirose et al. | |
| 2012/0326391 | A1 | 12/2012 | Hirose et al. | |
| 2013/0009365 | A1* | 1/2013 | Kabutoya | B32B 27/322 277/654 |
| 2014/0174654 | A1 | 6/2014 | Kabutoya et al. | |
| 2014/0182778 | A1 | 7/2014 | Kabutoya et al. | |
| 2015/0080276 | A1* | 3/2015 | Hansel | C08K 5/523 521/107 |
| 2015/0369365 | A1 | 12/2015 | Hirose et al. | |
| 2016/0122607 | A1* | 5/2016 | Pernecker | C09J 107/00 524/270 |
| 2017/0002238 | A1 | 1/2017 | Ihrig et al. | |
| 2017/0073550 | A1 | 3/2017 | Barrios et al. | |
| 2018/0282518 | A1 | 10/2018 | Ogawa et al. | |

FOREIGN PATENT DOCUMENTS

| | | | | |
|---|---|---|---|---|
| EP | 2341113 | A2 | 7/2011 | |
| EP | 2541104 | A2 | 2/2013 | |
| EP | 2749618 | A1 | 7/2014 | |
| EP | 2749619 | A1 | 7/2014 | |
| EP | 3165572 | A1 | 5/2017 | |
| JP | 2011153706 | A | 8/2011 | |
| JP | 2012184849 | A | 9/2012 | |
| JP | 2013010957 | A | 1/2013 | |
| JP | 2014125636 | A | 7/2014 | |
| JP | 2014126206 | A | 7/2014 | |
| WO | 2005061644 | A1 | 7/2005 | |
| WO | 2007094271 | A1 | 8/2007 | |
| WO | WO-2009084726 | A1 * | 7/2009 | C08L 83/00 |
| WO | 2016164535 | A1 | 10/2016 | |
| WO | 2017099154 | A1 | 6/2017 | |

OTHER PUBLICATIONS

International Search Report dated Jul. 8, 2019 issued in PCT/US19/29379.
Written Opinion dated Jul. 8, 2019 issued in PCT/US19/29379.
China First Office Action for CN Application No. 201980028174.X dated Jan. 26, 2022, 18 Pages, Machine Translation Included.
NPL Manual of Common Raw Materials for Fine Chemicals by Zhu Hongfa, 2 pages.
NPL Polyolefin Handbook 2nd Edition by Walsel, 2 pages.
First office action received for Japanese Application No. 2020-559547, mailed on Apr. 13, 2023, 10 pages.
Office Action issued in European Patent Application No. 19791465.8, dated Sep. 16, 2025 in 7 pages.

* cited by examiner

| | | | | |
|---|---|---|---|---|
| 1 | 1 | | 0.1 | 0.2 |
| 0.3 | 0.4 | | | 0.1 |
| 0.2 | | | | 0.2 |
| | | | | 0.1 |
| 0.1 | | 0.1 | 0.1 | 0.1 |
| 16.0% | | | | |

GEL GASKET

CLAIM OF PRIORITY

This application is a National Phase of PCT/US19/29379, filed Apr. 26, 2019, which claims priority to U.S. Application 62/662,948 filed on Apr. 26, 2018, the contents of which are hereby fully incorporated by reference in their entirety.

FIELD OF THE EMBODIMENTS

The field of the embodiments of the present invention relates to flame retardant sealing gel gaskets to be used to prevent or limit corrosion to a structure. In particular, the gel gasket has a specific storage modulus aimed to prevent adhesive residue left behind on a contact surface and corrosion to the contact surface.

BACKGROUND OF THE EMBODIMENTS

Conventionally, to prevent seepage of liquid or gas between two opposing faces in various machines and apparatuses or other structures, a gasket is set between the two opposing faces.

In the aerospace industry, aircraft components mainly comprise metal and fly at altitudes of 10,000 meters in the sky. However, the presence of any moisture due to condensation or electrolytes from oxygen could cause rusting or corrosion of the metal, which results in more time and cost in maintenance of the aircraft. In order to prevent this, generally the surface of the metal undergoes anti-corrosion treatment, but there may be unintentional scratching of the surface of the metal during transportation of such members. Therefore, gaskets are used to cover and protect the surface of such metal members from corrosion. Furthermore, when maintenance work is carried out on the aircraft, it is desirable from a workability standpoint to decrease the amount of residue on the metal members and to make the members easy to peel apart even after they have been in use for several years.

For example, an antenna to aid communication between aircraft and distant places is set on the outer surface of the body of the aircraft. Many such antennas have a plate-like fixing board with an electric connector protruding from one surface thereof. The surface of the fixing board has the protruding electric connector superposed on the outer face of the outer board. The connector is inserted into the inside of an aircraft from the hole formed on the outer board of the aircraft, and connected to an appropriate electric circuit in the aircraft. In this case, the fixing board of the antenna is generally removably installed on the outer board of the aircraft, where a gasket is set between the outer face of the outer board and the inner face of the antenna fixing board to seal the antenna fixing board.

Additionally, any gasket to be used in aircraft is required to be flame retardant. Moreover, since many of the components to be closely adhered to the gasket are metal plates, the gasket is required to have properties that do not discolor or corrode metal plates, and thereby preventing corrosion from the elements.

Various sealing apparatuses are known in the art. A conventional example can be found in US Patent Publication No. 2004/0070156, which describes that a gasket having an adhesive layer of a polyurethane gel is superior in flexibility, elasticity, compressibility, flexibility and the like, and non-reactive with constituent materials (in particular aluminum) on the outside of aircrafts and antenna fixing boards and with water (including brine). However, this conventional gel gasket is sandwiched by panels and cold flow, which leads to adhesive residue and corrosion. In other conventional sealing apparatuses, their structure and means of operation are substantially different from the present disclosure. These other inventions fail to solve all the problems taught by the present disclosure.

It is therefore desirable to create a gel gasket, comprising pressure sensitive adhesives, that is flexible, peels off the metal surface to which it adheres with little or no adhesive residue left on the metal surfaces, and is of a composition that does not degrade, which could lead to undesirable corrosion.

The gel gasket of this invention is made with pressure sensitive adhesives that are flexible enough to achieve compatibility with the surface of a member it is placed upon, but also has good peelability so little or no adhesive residue is left remaining on the metal structures when the gel gasket is removed during maintenance of the aircraft. The flexibility of the gel gasket inversely correlates with its storage modulus. A lower storage modulus generally indicates a higher flexibility, and a higher storage modulus indicates a lower flexibility. It is therefore desirable that the gel gasket has an optimum flexibility, as further discussed below.

In addition, it is important that the gel gasket maintains its structural integrity and does not degrade, which can result in undesirable corrosion of the metal it covers. The gel gasket protects the surface of the metal components; if the gel gasket degrades moisture can seep into the area between the gel gasket and the metal surface causing corrosion of the metal surface. The metal surface may in addition have a protective coating. Frequently this coating can become scratched or damaged. The gel gasket of this invention can serve to protect both metal and non-metal surfaces (such as the protective coating) from being scratched or damaged.

Disclosed herein is a gasket with a particular flexibility and, in addition achieves the desired anti-corrosion property and has good peelability. “Good peelability”, or “easily peelable”, as used herein describes a gasket or a tape that could be removed by hand using low adhesive peeling force and without leaving behind adhesive residue, and without causing breakage in the core film or similar damage. Furthermore, not only does this gasket have high anti-corrosion property, but it also leaves little residue even after years of use. Since acidification deteriorates the quality of an adhesive, adhesive resins that do not acidify easily were chosen and additives that trap acid were included, resulting in further longevity of the gasket.

At least one embodiment of this invention is presented in the drawings below and will be described in more detail herein.

SUMMARY OF THE EMBODIMENTS

In general, the present invention and its embodiments relate to a gel gasket that is sufficiently flame retardant, which does not cause corrosion and discoloration of a metal member to be adhered, and leaves little to no residue when removed from the metal surface. The invention has at least one pressure sensitive adhesive, a flame-retardant agent, a tackifier, and a stabilizer, wherein the at least one pressure sensitive adhesive comprises a polymer obtained by reacting a monomer or polymer with a cross-linking agent, the cross-linking agent having at least one siloxane bond and at least one reactive functional group; wherein the flame-retardant agent is a phosphorus flame-retardant agent;

wherein the tackifier has an acid value of less than 50 mg KOH/g; and the stabilizer is a Brønsted base.

For example, problems arising from adhesive residue and corrosion are often caused by protons, which may be generated from phosphoric acid derived from a phosphorous flame-retardant agent. The present invention can solve the above problems by suppressing the generation of the protons and capturing the protons. In one embodiment of the present invention there is a gel gasket having a pressure sensitive adhesive disposed on a polytetrafluoroethylene backing.

In one embodiment of the present invention the gel gasket has a core film.

In one embodiment of the present invention the gel gasket has a second pressure sensitive adhesive disposed on the core film.

In one embodiment of the present invention the gel gasket has a low acid tackifier.

In one embodiment of the present invention the low acid tackifier has an acid value of less than 50 mg KOH/g.

In one embodiment of the present invention the initial storage modulus and the storage modulus after storage at 66° C./80% RH for at least 2 weeks are in the range of 1,000-25,000 Pa.

In one embodiment of the present invention the pressure sensitive adhesive is a polyoxyalkylene adhesive.

In one embodiment of the present invention the core film is sandwiched between the pressure sensitive adhesive and the second pressure sensitive adhesive.

In one embodiment of the present invention the gel gasket has a flame retardant agent.

In one embodiment of the present invention the gel gasket has a cross-linking agent.

In one embodiment of the present invention the gel gasket has a stabilizer.

In one embodiment of the present invention the stabilizer is a hindered light amine stabilizer.

In one embodiment of the present invention the flame retardant agent is tricresyl phosphate.

In another embodiment of the present invention there is a gel gasket having a first pressure sensitive adhesive; a second pressure sensitive adhesive; and a core film sandwiched between the first pressure sensitive adhesive and the second pressure sensitive adhesive; wherein the storage modulus after storage at 66° C./80% RH for at least 2 weeks is in the range of 1,000-25,000 Pa.

In one embodiment of the present invention the first pressure sensitive adhesive and the second pressure sensitive adhesive are about 15 mil (381 μm) in thickness.

In one embodiment of the present invention the core film comprises polypropylene.

In one embodiment of the present invention the core film has a thickness of about 2 mil (50 μm).

In yet another embodiment of the present invention there is a gel gasket having a polyoxyalkylene adhesive; a tackifier having an acid value of less than 50 mg KOH/g; and wherein the storage modulus after storage at 66° C./80% RH for at least 2 weeks is in the range of 1,000-25,000 Pa. In further embodiments, the storage modulus after storage at 66° C./80% RH for at least 2 weeks is preferably 1,000-16,000 Pa, more preferably of 1,500-15,000 Pa, and furthermore preferably of 2,000-14,000 Pa.

In yet another embodiment of the present invention there is a method of preventing corrosion of a metal, the method comprising the steps of: providing a polyoxyalkylene adhesive, the polyoxyalkylene adhesive having a tackifier with an acid value of less than 50 mg KOH/g; and applying the polyoxyalkylene adhesive to a surface of the metal.

In general, the present invention succeeds in conferring the following, and others not mentioned, benefits and objectives.

It is an object of the present invention to provide a gel gasket that is flame retardant.

It is an object of the present invention to provide a gel gasket that is suitable for use in the aviation industry.

It is an object of the present invention to provide a gel gasket that prevents or limits corrosion of the metal surface to which it is applied.

It is an object of the present invention to provide a gel gasket that leaves little to no residue upon removal from the metal surface.

It is an object of the present invention to provide a gel gasket that resists deterioration of the adhesive.

DESCRIPTION OF THE PREFERRED EMBODIMENTS

Figure 1:
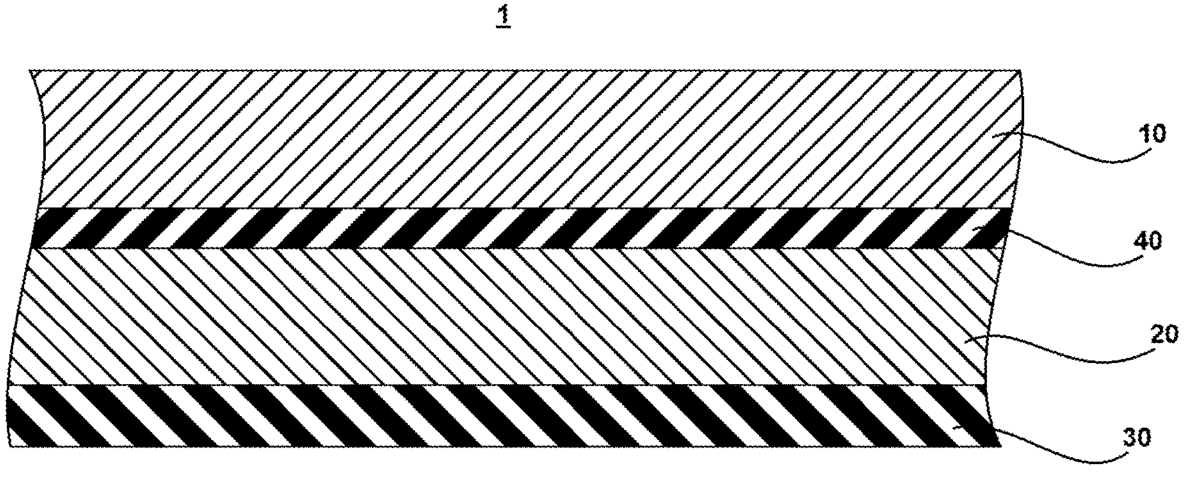
FIG. 1 is a side view of a gasket structure of a first embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
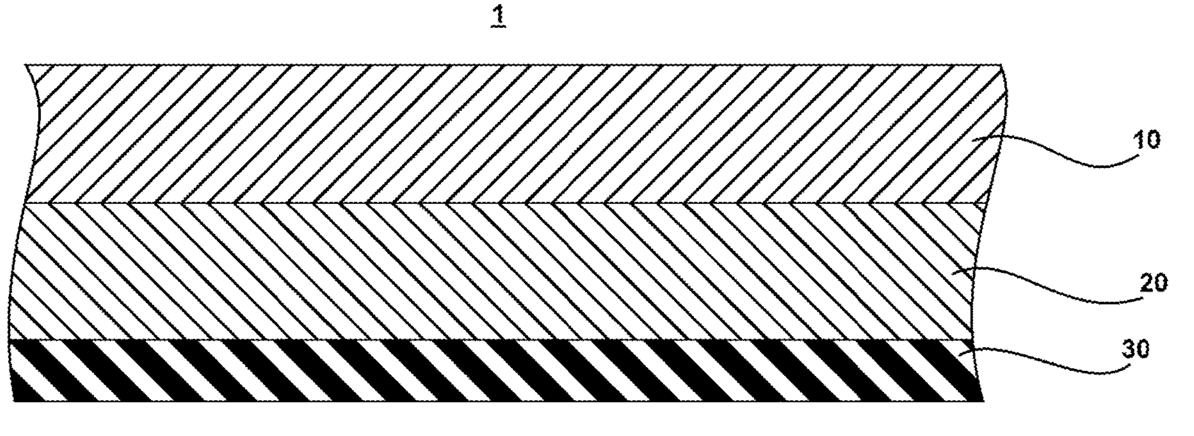
FIG. 2 is a side view of a gasket structure of a second embodiment of the present invention.

Referring now to FIGS. 1 and 2, there are sectional views of a gel gasket 1 comprised of a first pressure sensitive adhesive 10, a second pressure sensitive adhesive 20, backing film 30, and core film 40.

The gel gasket 1 may take a number of form factors and may exist in a sheet-like form or may be in a tape form. Either form factor, or another not explicitly described herein, should allow the gel gasket 1 to be cut or otherwise modified to cover a specifically sized area. In some embodiments, the core film 40 may be removed, as shown in FIG. 2. When removed, the first pressure sensitive adhesive 10 and the second pressure sensitive adhesive 20 may form a unitary layer.

The gel gasket 1 may be used on any type of surface to seal an area or otherwise prevent fouling of a material. Preferably, the gel gasket 1 is applied to a metal surface such as aluminum. However, the gel gasket 1 may be applied to various metals such as but not limited to iron, copper, lead, nickel, silver, tin, titanium, zinc, and various alloys thereof. While the gel gasket 1 is predominantly to be used in the aerospace industry, implementations may further be utilized on other transportation devices such as automobiles, boats, trains, etc. The gel gasket 1 may be used primarily for sealing purposes between two surfaces or may be used to protect the surface from corrosion or a combination thereof.

Pressure Sensitive Adhesive

Any type of pressure sensitive adhesive can be used as long as the parameters of the present invention are obtained. The pressure sensitive adhesive preferably comprises at least one of acrylic adhesive, rubber adhesive, silicone adhesive, and polyoxyalkylene adhesive.

The pressure sensitive adhesive is more preferably a polyoxyalkylene adhesive comprising a polyoxyalkylene polymer having at least one alkenyl group in each molecule ("component A"), a compound containing two or more hydrosilyl groups on average in each molecule ("component B"), and a hydrosilylation catalyst ("component C"). In a preferred embodiment, the polyoxyalkylene adhesive is one such as ACX022 produced by Kaneka Corporation of Japan. The pressure sensitive adhesive may have a thickness of over 100 μm and is more preferably over 300 μm. The total thickness in an embodiment where there are two adhesive layers sandwiching a core film is preferably less than 3000 μm, and is more preferably less than 1500 μm, and most preferably less than 1200 μm. The total thickness in an embodiment where there is at least one adhesive layer without a core film is preferably from 100 μm to 3000 μm, and is more preferably from 300 μm to 1500 μm, and is most preferably to 500 μm to 1200 μm.

The pressure sensitive adhesive of the present invention is mainly characterized by, as shown in one embodiment, being a cured product of a composition containing the following components: a polyoxyalkylene polymer having at least one alkenyl group in each molecule (component A); a compound containing two or more hydrosilyl groups on average in each molecule (component B); and a hydrosilylation catalyst (component C).

The pressure sensitive adhesive is synthesized by a hydrosilylation reaction of compound A with compound B, in the presence of compound C. The gel gasket disclosed herein comprises compound A, compound B, compound C (i.e. a catalyst), a phosphate ester-based flame retardant, and a tackifier that has a carboxylic acid moiety. It is believed that when the gel gasket ages under high temperature and high humidity conditions, the phosphate ester in the flame retardant is catalyzed by the carboxylic acid from the tackifier and hydrolysis occurs, thereby generating phosphoric acid. The relatively high acidity of the phosphoric acid in turn causes hydrolysis to occur in the siloxane bonding of compound B, leading to a cleavage in the cross-linking network of the gel gasket that ultimately results in deterioration of the gel gasket.

In order to mitigate or prevent deterioration in the gel gasket disclosed herein, in some embodiments, it is preferable to use a low acid value tackifier with an acid value of 50 mgKOH/g or below in order to mitigate deterioration. In some embodiments, it is preferable to add a stabilizer to the gel gasket that can trap any acid, such as carboxylic acid and phosphoric acid. In some embodiments, it is preferable that the stabilizer comprise a Brønsted base such as a secondary or tertiary amine compound. In some embodiments, it is preferable that the stabilizer is sterically hindered in order to reduce the interaction between the nitrogen and platinum atoms of the compound C (a catalyst) because otherwise, curing would be inhibited since amine acts as a catalytic poison to platinum. In some embodiments, it is preferable to use a stabilizer that is an amine with high basicity, such as an amine stabilizer comprising a piperidyl group. Specific examples of the stabilizer include BASF Corporation's Tinuvin 765, Tinuvin 770, Tinuvin 144, Tinuvin 292, and the like.

Polyoxyalkylene Polymer

As used herein, the term "polyoxyalkylene polymer having at least one alkenyl group in each molecule" (component A) is not particularly limited, and various polymers can be used. However, one wherein the main chain of the polymer has a repeat unit represented by the formula shown below is preferable:

$$—R^1—O—$$

wherein $R^1$ is an alkylene group.

$R^1$ is preferably a linear or branched alkylene group having 1 to 14, more preferably 2 to 4, carbon atoms.

The main chain skeleton of the polyoxyalkylene polymer may consist of only one kind of repeat unit, and may consist of two kinds or more of repeat units. Particularly, from the aspects of availability and workability, a polymer having $—CH_2CH(CH_3)O—$ as a main repeat unit is preferable. In the main chain of the polymer, a repeat unit other than the oxyalkylene group may be contained. In this case, the total sum of oxyalkylene units in the polymer is preferably not less than 80% by weight, particularly preferably not less than 90% by weight.

Although the polymer may be a linear polymer or a branched polymer, or a mixture thereof, it preferably contains a linear polymer in a proportion of not less than 50% by weight, so that the adhesive layer will show good adhesiveness to the surface of various materials.

The molecular weight of the polymer is preferably 500 to 50,000, more preferably 5,000 to 30,000, in terms of number-average molecular weight. When the number average molecular weight is less than 500, the obtained cured product tends to be too brittle, and when the number average molecular weight exceeds 50,000, the viscosity becomes unfavorably too high to markedly decrease workability. The number average molecular weight here means the value obtained by Gel Permeation Chromatography (GPC) method.

The polymer preferably has a narrow molecular weight distribution wherein the ratio of weight-average molecular weight and number-average molecular weight (Mw/Mn) is not more than 1.6; a polymer having an Mw/Mn of not more than 1.6 produces a decreased viscosity of the composition and offers improved workability. Hence, the Mw/Mn is more preferably not more than 1.5, still more preferably not more than 1.4. As mentioned herein, Mw/Mn refers to a value obtained by the gel permeation chromatography (GPC) method.

Here, the molecular weight (based on polystyrene) is measured by the GPC method using GPC apparatus (HLC-8120GPC) manufactured by Tosoh Corporation, where the measurement conditions are as follows.

Sample concentration: 0.2 wt % (THF solution)

Sample injection volume: 10 μl

Eluent: THF

Flow rate: 0.6 ml/min

Measurement temperature: 40° C.

Column: sample column TSKgel GMH-H(S)

Detector: differential refractometer

With regard to the polymer of component A (polyoxyalkylene polymer having at least one alkenyl group in each molecule), the alkenyl group is not subject to limitation, but an alkenyl group represented by the formula (2) shown below is suitable:

$H_2C{=}C(R^2)—$ wherein R2 is hydrogen or a methyl group.

The mode of binding of the alkenyl group to the polyoxyalkylene polymer is not subject to limitation; for example, alkenyl group direct bond, ether bond, ester bond, carbonate bond, urethane bond, urea bond and the like can be included.

As specific examples of the polymer of component A, a polymer represented by the general formula (3):

$\{H_2C{=}C(R^{3a})—R^{4a}—O\}a_1R^{5a}$ wherein $R^{3a}$ is hydrogen or a methyl group; $R^{4a}$ is a divalent hydrocarbon group having 1 to 20 carbon atoms, optionally having one or more ether groups, $R^{5a}$ is a polyoxyalkylene polymer residue; $a_1$ is a positive integer. As $R^{4a}$ in the formula, specifically, $—CH_2—$, $—CH_2CH_2—$, $—CH_2CH_2CH_2—$, $—CH_2CH(CH_3)CH_2—$, $—CH_2CH_2CH_2CH_2—$, $—CH_2CH_2OCH_2CH_2—$, or $—CH_2CH_2OCH_2CH_2CH_2—$ and the like can be included; for the ease of synthesis, $—CH_2—$ is preferable.

A polymer having an ester bond, represented by the formula (4):

$\{H_2C{=}C(R^{3b})—R^{4b}—OCO\}a_2R^{5b}$ wherein $R^{3b}$, $R^{4b}$, $R^{5b}$ and $a_2$ have the same definitions as those of $R^{3a}$, $R^{4a}$, $R^{5a}$, and $a_1$, respectively, can also be included.

A polymer represented by the formula (5):

$\{H_2C{=}C(R^{3c})\}a_3R^{5c}$ wherein $R^{3c}$, $R^{5c}$ and $a_3$ have the same definitions as those of $R^{3a}$, $R^{5a}$, and $a_1$, respectively, can also be included.

Furthermore, a polymer having a carbonate bond, represented by the formula (6):

$\{H_2C{=}C(R^{3d})R^{4d}—O(CO)O\}a_4R^{5d}$ wherein $R^{3d}$, $R^{4d}$, $R^{5d}$ and $a_4$ have the same definitions as those of $R^{31}$, $R^{4a}$, $R^{5a}$ and $a_1$, respectively, can also be included.

It is preferable that at least 1, preferably 1 to 5, more preferably 1.5 to 3, alkenyl groups be present in each molecule of the polymer. If the number of alkenyl groups contained in each molecule of the polymer is less than 1, the curing is insufficient; if the number exceeds 5, the mesh structure becomes so dense that the polymer sometimes fails to exhibit a good adherence. The polymer can be synthesized according to the method described in JP-A-2003-292926, and any commercially available product can be used.

Cross-Linking Agent

The above polymer may be combined with a compound containing two or more hydrosilyl groups (on average) in each molecule (crosslinking agent "component B") can be used without limitation, as long as it has a hydrosilyl group (a group having an Si—H bond), but from the viewpoint of the ease of obtainment of raw materials and compatibility with the component A, an organohydrogen polysiloxane modified with an organic constituent is particularly preferable. The aforementioned polyorganohydrogen siloxane modified with an organic constituent more preferably has an average of 2 to 8 hydrosilyl groups in each molecule.

Specific examples of the structure of the polyorganohydrogen siloxane include linear or cyclic ones represented by, for example,

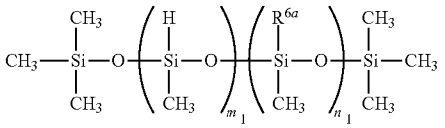

wherein $2 \le m_1+n_1 \le 50$, $2 \le m_1$, and $0 \le n_1$, $R^{6a}$ is a hydrocarbon group having 2 to 20 carbon atoms in the main chain thereof, optionally comprising one or more phenyl groups,

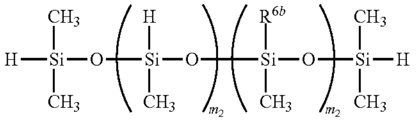

wherein $0 \le m_2+n_2 \le 50$, $0 \le m_2$, and $0 \le n_2$, $R^{6b}$ is a hydrocarbon group having 2 to 20 carbon atoms in the main chain thereof, optionally comprising one or more phenyl groups, or

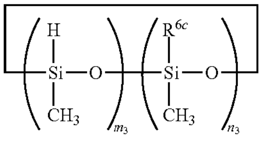

wherein $3 \le m_3+n_3 \le 20$, $2 \le m_3 \le 19$, and $0 \le n_3 \le 18$, $R^{6c}$ is a hydrocarbon group having 2 to 20 carbon atoms in the main chain thereof, optionally having one or more phenyl groups, and the like, and ones having two or more of these units, represented by the following:

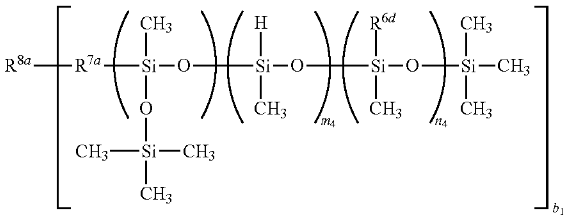

wherein $1 \le m_4+n_4 \le 50$, $1 \le m_4$, and $0 \le n_4$, $R^{6d}$ is a hydrocarbon group having 2 to 20 carbon atoms in the main chain thereof, optionally having one or more phenyl groups, $2 \le b_1$, $R^{8a}$ is a divalent to tetravalent organic group, and $R^{7a}$ is a divalent organic group, but $R^{7a}$ may be absent depending on the structure of $R^{8a}$,

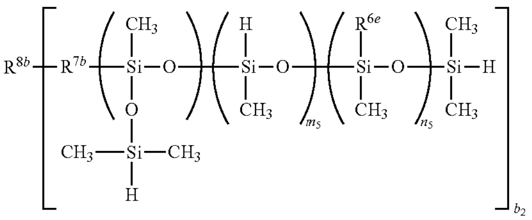

wherein $0 \leq m_5+n_5 \leq 50$, $0 \leq m_5$, and $0 \leq n_5$, $R^{6e}$ is a hydrocarbon group having 2 to 20 carbon atoms in the main chain thereof, optionally having one or more phenyl groups, $2 \leq b_2$, $R^{8b}$ is a divalent to tetravalent organic group, and $R^{7b}$ is a divalent organic group, however, $R^{7b}$ may be absent depending on the structure of $R^{8b}$, or

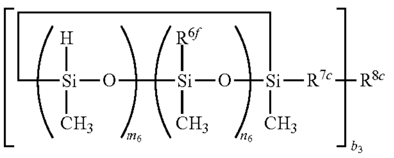

wherein $3 \leq m_6+n_6 \leq 50$, $1 \leq m_6$, and $0 \leq n_6$, $R^{6f}$ is a hydrocarbon group having 2 to 20 carbon atoms in the main chain thereof, optionally comprising one or more phenyl groups, $2 \leq b_3$, $R^{8c}$ is a divalent to tetravalent organic group, and $R^{7c}$ is a divalent organic group, however, $R^{7c}$ may be absent depending on the structure of $R^{8c}$, and the like.

The "compound containing two or more hydrosilyl groups on average in each molecule" (component B) preferably has good compatibility with the polyoxyalkylene polymer (component A) and the hydrosilylation catalyst (component C), or good dispersion stability in the system. Particularly, if the viscosity of the entire system is low, use of an ingredient whose compatibility with any of the above-described ingredients is low sometimes causes phase separation and a curing failure.

As a specific example of the component B having relatively good compatibility with the component A and the component C, or relatively good dispersion stability, the following can be included.

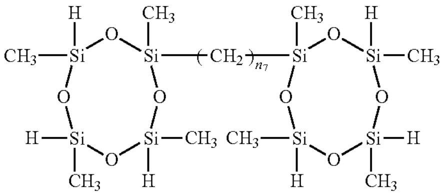

wherein $n_7$ is an integer of not less than 4 and not more than 10,

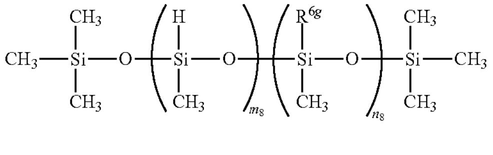

wherein $2 \leq m_8 \leq 10$ and $0 \leq n_8 \leq 5$, $R^{6g}$ is a hydrocarbon group having eight or more carbon atoms.

As specific preferable examples of the component B, polymethylhydrogen siloxane can be included; for assuring compatibility with the component A and adjusting the SiH content, a compound modified with α-olefin, styrene, α-methylstyrene, allylalkyl ether, allylalkyl ester, allylphenyl ether, allylphenyl ester or the like can be included; as an example, the following structure can be included.

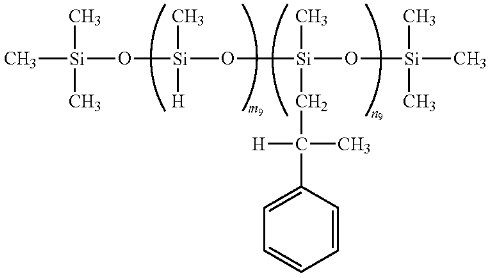

wherein $2 \leq m_9 \leq 20$ and $1 \leq n_9 \leq 20$.

The component B can be synthesized by a commonly known method, and any commercially available product can be used.

The amount of the crosslinking agent to be used is less than 10 parts by weight, preferably not more than 9 parts by weight, more preferably not more than 8 parts by weight, relative to the monomer or polymer for the pressure sensitive adhesive. A ratio of the crosslinking agent exceeding 10 parts by weight is not preferable, since crosslinking may proceed too much to decrease adhesiveness. In at least one embodiment, the amount of the crosslinking agent is preferably in the range of 2.0 to 7.0 parts, more preferably 2.0 to 6.0 parts, further more preferably 2.0 to 5.0 parts, further most preferably 2.0 to 4.0 parts, by weight per 100 parts of the monomer or polymer for the pressure sensitive adhesive.

<Hydrosilylation Catalyst>

In the present invention, the "hydrosilylation catalyst" (component C) is not subject to limitation; an optionally chosen one can be used. As specific examples, chloroplatinic acid; platinum; solid platinum carried by a carrier such as alumina, silica, or carbon black; a platinum-vinylsiloxane complex; a platinum-phosphine complex; a platinum-phosphite complex; $Pt(acetylacetonate\ acac)_2$ and the like can be included.

As examples of catalysts other than platinum compounds, $RhCl(PPh_3)_3$, $RhCl_3$, $Rh/Al_2O_3$, $RuCl_3$, $IrCl_3$, $FeCl_3$, $AlCl_3$, $PdCl_2$, $2H_2O$, $NiCl_2$, $TiCl_4$ and the like can be included.

These catalysts may be used alone, and may be used in combination of two kinds or more. With regard to catalyst activity, chloroplatinic acid, a platinum-phosphine complex, a platinum-vinylsiloxane complex, and the like are preferable.

Although the amount of the component C formulated is not subject to limitation, from the viewpoint of assurance of composition potlife and transparency of the cured product (adhesive layer), the amount is generally not more than $1 \times 10^{-1}$ mol, preferably not more than $5.3 \times 10^{-2}$ mol, relative to 1 mol of alkenyl groups in the component A; particularly, from the viewpoint of transparency of the cured product (adhesive layer), the amount is more preferably not more than $3.5 \times 10^{-2}$ mol, particularly preferably not more than $1.4 \times 10^{-3}$ mol. When the amount exceeds $1 \times 10^{-1}$ mol relative to 1 mol of alkenyl groups in the component A, the finally obtained cured product (adhesive layer) is likely to undergo yellowing and the transparency of the cured product (adhesive layer) tends to be damaged. When the amount of the component C formulated is too low, the composition curing speed is slow, and the curing quality tends to be unstable; therefore, the amount is preferably not less than $8.9\times10^{-5}$ mol, more preferably not less than $1.8\times10^{-4}$ mol.

Ratio of Polymers/Cross-Linking Agent/Catalysts

The composition comprising the above-described components A to C is cured by heating. That is, the alkenyl group of component A (polyoxyalkylene polymer having at least one alkenyl group in each molecule) is hydrosilylated by the hydrosilyl group (group having Si—H bond) of component B (compound containing two or more hydrosilyl groups on average in each molecule) in the presence of a hydrosilylation catalyst (component C) to allow cross linking to proceed, whereby curing is completed. The cured product has low activity, and does not react upon contact with various substances such as water, metal, plastic material and the like.

In a composition comprising components A to C, it is preferable that the hydrosilyl groups of the component B (compound B) be contained (formulated) so that the functional group ratio to the alkenyl groups of the component A (compound A) will be in the range between 0.3 to 10, more preferably in the range between 0.4 to 8, and particularly more preferably in the range between 0.5 to 6. When the hydrosilyl groups are contained so that the foregoing functional group ratio will exceed 10, the crosslinking density increases, and it is sometimes impossible to obtain adhesiveness. When the functional group ratio is less than 0.3, crosslinking in the cured product becomes too weak, and retention of characteristics at high temperatures may become difficult.

Flame Retardant

In the present invention, the flame retardant is a phosphorus flame retardant. Phosphorus flame retardants are preferable since they can impart flame retardancy and are superior in the suppression of drip during combustion, compatibility to environmental regulation and the like.

Examples of the phosphorus flame retardant include phosphates, aromatic condensed phosphates, ammonium polyphosphates and the like. Specific examples of the phosphate include triphenyl phosphate, tricresyl phosphate (TCP), cresyl diphenyl phosphate (CDP), 2-ethylhexyldiphenyl phosphate, triethyl phosphate (TEP), tri-n-butyl phosphate, trixylenyl phosphate, xylenyl diphenyl phosphate (XDP) and the like. Specific examples of the aromatic condensed phosphate include resorcinol bisdiphenyl phosphate, bisphenol A bis(diphenyl phosphate), resorcinol bisdixylenyl phosphate and the like. Specific examples of the ammonium polyphosphate include ammonium polyphosphate (APP), melamine-modified ammonium polyphosphate and coated ammonium polyphosphate. Here, the coated ammonium polyphosphate is obtained by coating or microcapsulating ammonium polyphosphate with a resin to enhance water resistance. The phosphate, aromatic condensed phosphate and ammonium polyphosphate can be used concurrently. A combined use of phosphate and ammonium polyphosphate is preferable since flame retardancy in both the solid phase and gaseous phase can be achieved by a combination of a flame retardancy effect of a char layer formed by phosphate and a flame retardancy effect of noncombustible gas production by ammonium polyphosphate.

The flame retardant agent is a phosphorus flame retardant, more preferably a phosphate ester or the derivative thereof, further more preferably a phosphate ester and further most preferably a tricresyl phosphate.

One or more kinds of the flame retardants can be used in a mixture. While the amount thereof to be used varies depending on the kind of the flame retardant, it is generally preferably not less than 10 parts by weight, more preferably not less than 20 parts by weight, particularly preferably not less than 30 parts by weight, relative to the adhesive, since the effects of flame retardancy, drip suppression by char layer formation and the like can be efficiently achieved. It is preferably not more than 350 parts by weight, more preferably not more than 250 parts by weight, particularly preferably not more than 150 parts by weight, since more superior adhesive property, preservability and the like can be obtained.

Tackifier

The pressure-sensitive adhesive layer containing a flame retardant can contain a tackifier resin to improve adhesion to a sealed object and flame retardancy. Examples of the tackifier resin include terpene tackifier resin, phenol tackifier resin, rosin based tackifier resin, petroleum tackifier resin and the like. One or more kinds of tackifier resin can be used.

Examples of the terpene tackifier resin include terpene resins such as α-pinene polymer, β-pinene polymer, dipentene polymer and the like, modified terpene resins (e.g., terpenephenol resin, styrene-modified terpene resin, aromatic-modified terpene resin, hydrogenated terpene resin etc.) obtained by modifying (phenol-modification, aromatic-modification, hydrogenated-modification, hydrocarbon-modification etc.) these terpene resins, and the like.

Examples of the phenol tackifier resin include condensates (e.g., alkylphenol resin, xyleneformaldehyde resin and the like) of various phenols (e.g., phenol, m-cresol, 3,5-xylenol, p-alkylphenol, resorcin etc.) and formaldehyde, resol obtained by addition reaction of the aforementioned phenol with formaldehyde using an alkali catalyst, novolac obtained by condensation reaction of the aforementioned phenol with formaldehyde using an acid catalyst and the like.

Examples of the rosin based tackifier resin include unmodified rosin (natural rosin) such as gum rosin, wood rosin, tall oil rosin and the like, modified rosin (hydrogenated rosin, disproportionated rosin and polymerized rosin, and other chemically-modified rosin etc.) obtained by modifying the above unmodified rosins by hydrogenation, disproportionation, polymerization and the like, various rosin derivatives and the like. Examples of the aforementioned rosin derivative include rosin esters such as modified rosin ester compound obtained by esterifying modified rosin (rosin ester compound obtained by esterifying unmodified rosin with an alcohol, hydrogenated rosin, disproportionated rosin, polymerized rosin and the like) with an alcohol and the like; unsaturated fatty acid-modified rosins obtained by modifying unmodified rosin or modified rosin (hydrogenated rosin, disproportionated rosin, polymerized rosin etc.) with unsaturated fatty acid; unsaturated fatty acid modified rosin ester obtained by modifying rosin ester with an unsaturated fatty acid; rosin alcohols obtained by reduction-treating a carboxyl group in unmodified rosin, modified rosin (hydrogenated rosin, disproportionated rosin, polymerized rosin etc.), unsaturated fatty acid-modified rosins or unsaturated fatty acid-modified rosin esters; metal salts of rosins (particularly, rosin esters) such as unmodified rosin, modified rosin, various rosin derivatives and the like; and the like. In addition, as the rosin derivative, a rosin phenol resin obtained by adding phenol to rosins (unmodified rosin, modified rosin, various rosin derivatives etc.) with an acid catalyst and subjecting same to thermal polymerization and the like can also be used.

Examples of the alcohol to be used for obtaining the above-mentioned rosin esters include divalent alcohols such as ethylene glycol, diethylene glycol, propylene glycol, neopentyl glycol and the like, trivalent alcohols such as glycerol, trimethylolethane, trimethylolpropane and the like, tetravalent alcohols such as pentaerythritol, diglycerol and the like, hexahydric alcohols such as dipentaerythritol etc. and the like. These are used alone or in a combination of two or more kinds thereof.

Examples of the petroleum tackifier resin include known petroleum resins such as aromatic petroleum resin, aliphatic petroleum resin, alicyclic petroleum resin (aliphatic cyclic petroleum resin), aliphatic aromatic petroleum resin, aliphatic alicyclic petroleum resin, hydrogenated petroleum resin, coumarone resin, coumarone indene resin and the like. Specific examples of the aromatic petroleum resin include polymers using one or more kinds of vinyl group-containing aromatic hydrocarbon having 8 to 10 carbon atoms (styrene, o-vinyltoluene, m-vinyltoluene, p-vinyltoluene, α-methylstyrene, β-methylstyrene, indene, methylindene etc.) and the like. As the aromatic petroleum resin, an aromatic petroleum resin obtained from a fraction such as vinyltoluene, indene and the like (i.e., "C9 petroleum fraction") (namely, "C9 based petroleum resin") can be used preferably. Examples of the aliphatic petroleum resin include polymers obtained by using one or more kinds selected from dienes such as olefin having 4 or 5 carbon atoms (e.g., butene-1, isobutylene, pentene-1 etc.), butadiene, piperylene, 1,3-pentadiene, isoprene etc., and the like. Furthermore, as the aliphatic petroleum resin, an aliphatic petroleum resin obtained from a fraction such as butadiene, piperylene, isoprene and the like (i.e., "C4 petroleum fraction", "C5 petroleum fraction" etc.) (namely, "C4 based petroleum resin", "C5 based petroleum resin" etc.) can be used preferably. Examples of the alicyclic petroleum resin include an alicyclic hydrocarbon resin obtained by cyclization and dimerization of an aliphatic petroleum resin (i.e., "C4 based petroleum resin", "C5 based petroleum resin" etc.), followed by polymerization, a polymer of a cyclic diene compound (cyclopentadiene, dicyclopentadiene, ethylidenenorbornane, dipentene, ethylidenebicycloheptene, vinylcycloheptene, tetrahydroindene, vinylcyclohexene, limonene etc.) or a hydrogenated resin thereof, an alicyclic hydrocarbon resin obtained by hydrogenating the aromatic ring of the aforementioned aromatic hydrocarbon resin, the following aliphatic aromatic petroleum resin and the like. Examples of the aliphatic aromatic petroleum resin include a styrene-olefin copolymer and the like. In addition, as the aliphatic aromatic petroleum resin, a so-called "C5/C9 copolymerization petroleum resin" and the like can be used.

The tackifier resin is preferably terpene tackifier resin and/or rosin based tackifier resin, particularly preferably rosin based tackifier resin, from the aspect of flame retardancy of backing. The terpene tackifier resin and rosin based tackifier resin easily provide effect as flame retardant auxiliary agents. Using these, adhesion of a backing to a sealed object and flame retardancy of a backing can be improved more remarkably. The terpene tackifier resin is particularly preferably a terpenephenol resin, the rosin based tackifier resin is particularly preferably rosin ester (i.e., esterified compound of unmodified rosin, hydrogenated rosin, disproportionated rosin or polymerized rosin), and the rosin ester is preferably trivalent or higher polyhydric alcohol ester, particularly preferably tetra to hexahydric polyhydric alcohol ester.

One or more kinds of the tackifier resins can be used in combination, and the amount thereof to be used is not particularly limited. However, it is preferably not less than parts by weight, more preferably not less than 5 parts by weight, particularly preferably not less than 10 parts by weight, relative to the weight of the adhesive. From the aspects of maintenance of adhesive property, preservability, handling property, dispersibility and the like, it is preferably not more than 100 parts by weight, more preferably not more than 60 parts by weight, particularly preferably not more than 40 parts by weight. It is desirable that the acid value of the tackifier be less than 50 mg KOH/g and is more preferably equal to or less than 40 mg KOH/g, particularly preferably not more than 20 mg KOH/g. In any event, it is preferable that the acid value of the tackifier is more than 1 mg KOH/g. However, a tackifier with an acid value that is greater than 50 mg KOH/g would cause deterioration in the adhesive, leading to more adhesive residue and is thus to be avoided.

Core Film

The material of core film is not particularly limited. Examples thereof include a single layer or laminate plastic film made from one or more kinds selected from polyester (e.g., poly(ethylene terephthalate) (PET) and the like); nylon; polyvinyl chloride; polyvinylidene chloride; polyimide (PI); polyamide; polyphenylene sulfide (PPS); polyether ether ketone (PEEK); ionomer; polyolefin (e.g., polyethylene, polypropylene, reactor TPO, ethylene-vinyl acetate copolymer and the like); fluororesin (e.g., polytetrafluoroethylene (PTFE), polychlorotrifluoroethylene (PCTFE), polyvinylidene fluoride (PVDF), polyvinyl fluoride (PVF), perfluoroalkoxy fluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like) and the like, a metal foil, and the like. Also, it may be a film obtained by laminating a plastic film and a metal foil. The core film is preferably a nonporous film. The "nonporous film" means a solid film excluding mesh cloth, woven fabric, non-woven fabric, mesh film (sheet), perforated film (sheet) and the like. The core film makes the tensile strength of the gel gasket high. It is preferable because the gasket becomes easily removable during routine maintenance.

In some embodiments, the core film may have a thickness of about 5 μm to about 125 μm and is more preferably about 10 μm to 60 μm. When the thickness of the core film is less than 5 μm, the workability of the gel gasket when it is peeled during maintenance checks decreases. This gasket material is usually stored in roll shape, and it is winded after coating. However, when too thick of a core film is used, such as that with a thickness that is greater than 125 μm, the adhesive layer and the core film layer becomes partially disbonded or the core film becomes wrinkled at winding. This causes a bad appearance and roughens the adhesive surface, leading to bad corrosion effects.

The surface of the core film can be treated with, for example, a corona treatment, chromic acid treatment, ozone treatment, flame treatment, plasma treatment, sodium etching, and primer coating.

Crosslinking Agent

The pressure sensitive adhesive can contain a crosslinking agent in addition to a base polymer, and the crosslinking agent can improve adhesion to a sealed object and durability, and can provide reliability at a high temperature and maintain the form of the adhesive itself. As the crosslinking agent, a known crosslinking agent such as isocyanate based crosslinking agents, epoxy based crosslinking agents, peroxide based crosslinking agents, metal chelate based crosslinking agents, oxazoline based crosslinking agents and the like can be appropriately used. One or more kinds of these crosslinking agents can be used in combination.

Stabilizer

The pressure sensitive adhesive may have one or more added stabilizers. Stabilizers for polymers are used directly or by combinations to prevent the various effects such as oxidation, chain scission and uncontrolled recombinations and cross-linking reactions that are caused by photo-oxidation of polymers. In at least one embodiment, the role of the stabilizer is to effectively "capture" or react with protons created via degradation of the gel gasket.

Polymers are considered to get weathered due to the direct or indirect impact of heat and ultraviolet light. The effectiveness of the stabilizers against weathering depends on solubility, ability to stabilize in different polymer matrix, the distribution in matrix, evaporation loss during processing and use. The effect on the viscosity is also an important concern for processing. A stabilizer as used in the present application is preferably a Brønsted base, more preferably "an amine with high basicity", and further more preferably "a hindered light amine stabilizer." The amine is preferably a secondary or tertiary amine. The pH value of a Brønsted base such as "an amine with high basicity" or "a hindered amine light stabilizer (HALS)" is preferably 7.5 or more, more preferably 7.5 or more, and further preferably 8.0 or more. The upper limit for the pH value of a Brønsted base such as "an amine with high basicity" or "a hindered amine light stabilizers (HALS)" is limited, however, to preferably 12 or less, and more preferably 10 or less. Various hindered amine light stabilizers (HALS) may be utilized including but not limited to BASF Corporation's Tinuvin 765, Tinuvin 770, Tinuvin 144, or Tinuvin 292. Exemplary stabilizers may include but are not limited to bis(1,2,2,6,6-pentamethyl-4-piperidyl)sebacate, methyl 1,2,2,6,6-pentamethyl-4-piperidyl sebacate, bis(2,2,6,6,-tetramethyl-4-piperidyl)sebaceate or combinations thereof.

The amount of the stabilizer to be used is not more than 5 parts by weight, preferably 2 parts by weight, more preferably 1 part by weight, relative to the polymer. A ratio of the stabilizer exceeding 10 parts by weight is not preferable.

Backing Film

The material of the backing film is not particularly limited. Examples thereof include a single layer or laminate plastic film made from one or more kinds selected from polyester (e.g., poly(ethylene terephthalate) (PET) and the like); nylon; polyvinyl chloride; polyvinylidene chloride; polyimide (PI); polyamide; polyphenylene sulfide (PPS); polyether ether ketone (PEEK); ionomer; polyolefin (e.g., polyethylene, polypropylene, reactor TPO, ethylene-vinyl acetate copolymer and the like); fluororesin (e.g., polytetrafluoroethylene (PTFE), polychlorotrifluoroethylene (PCTFE), polyvinylidene fluoride (PVDF), polyvinyl fluoride (PVF), perfluoroalkoxy fluororesin (PFA), tetrafluoroethylene hexafluoropropylene copolymer (FEP), ethylene tetrafluoroethylene copolymer (ETFE), ethylene chlorotrifluoroethylene copolymer (ECTFE) and the like) and the like, a metal foil, and the like. Also, it may be a film obtained by laminating a plastic film with a metal foil. The backing film is preferably a nonporous film. "Nonporous film" herein means a solid film excluding mesh cloth, woven fabric, non-woven fabric, mesh film (sheet), perforated film (sheet) and the like.

A fluororesin sheet is particularly preferable, and a polytetrafluoroethylene (PTFE) sheet is especially preferable.

The surface of the backing film can be treated with, for example, a corona treatment, chromic acid treatment, ozone treatment, flame treatment, plasma treatment, sodium etching, and primer coating.

Salt Spray Test

A 3 inch by 3 inch test sample of an embodiment of the present invention was positioned upon a 4 inch by 4 inch duralumin panel (7075T76). The test sample was subjected to a salt water spray test under the following conditions:

Method: ASTM D610
Sample Angle: 300
Test Time: 250 hours
Temperature: 35° C. (+1.1-1.7° C.) as
Salt Solution: 5% NaCl (wt %/wt %)

Figures 3A, 3B:
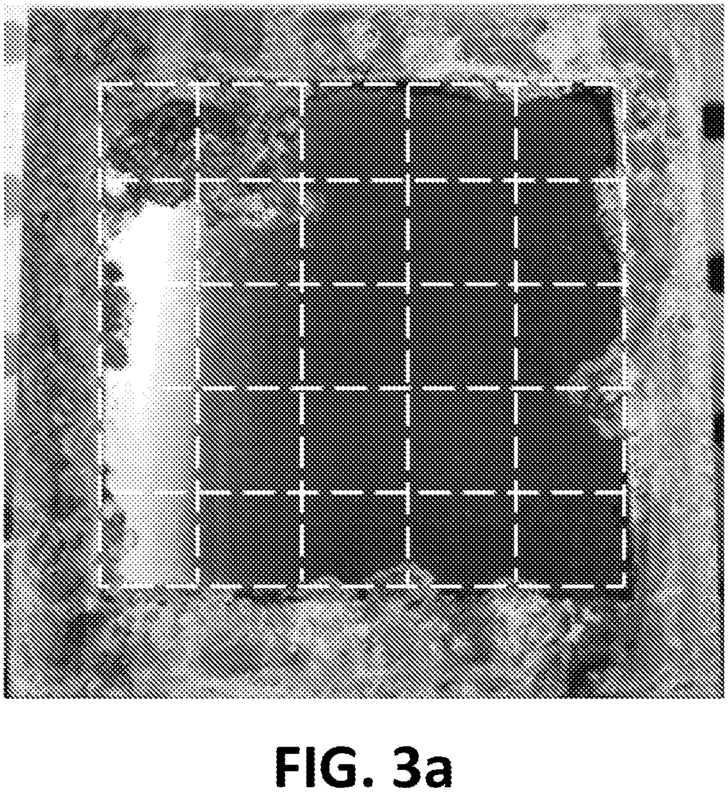
FIG. 3*a* and FIG. 3*b* show the method for visually determining the corroded area after exposing a sample aluminum panel to a salt spray test for 250 hours, based on ASTM D610.

After the test, the test sample was detached from the duralumin panel and the ratio of the corroded area to the whole area of the duralumin panel was determined via visual inspection The panel was divided into a grid of 5×5 squares, the amount of the corroded area was visually determined for each square (complete corrosion in a square was assigned a value of "1") and added up to obtain a total value (up to a total value of "25"), and the percentage of the corroded area was calculated based on this total value (total value of "25" would indicate 100% corrosion), as shown in FIGS. 3*a* and 3*b*. It was determined that the corroded area was approximately 16.0% of the duralumin panel.

Figure 4A:
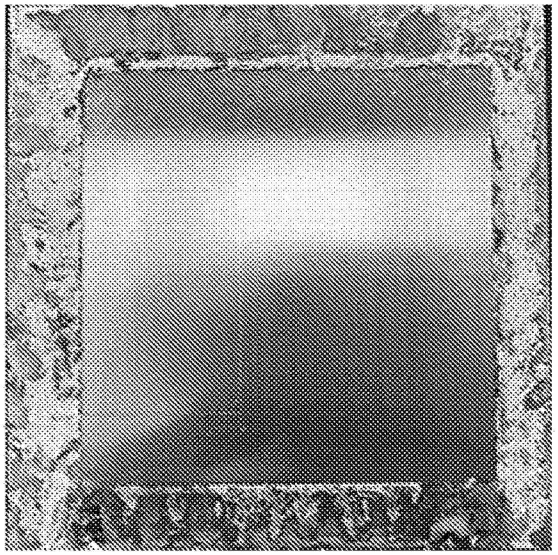
FIG. 4*a* shows an aluminum panel before it is subject to a salt spray test.
Figure 4B:
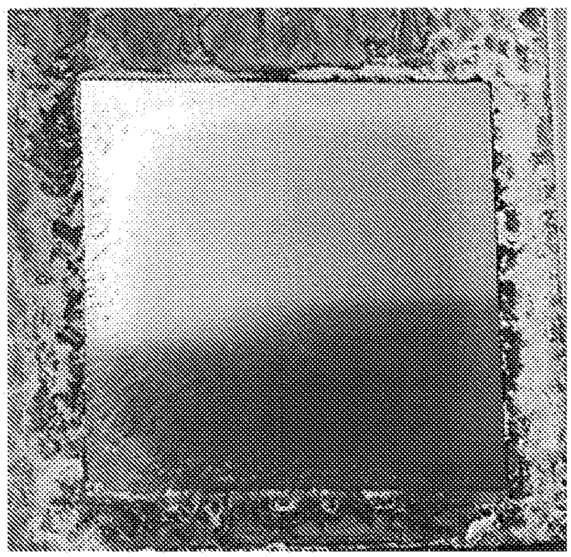
FIG. 4*b* shows an example of an acceptable amount of adhesive residue after exposing a sample aluminum panel to a salt spray test for 250 hours, based on ASTM D610.
Figure 4C:
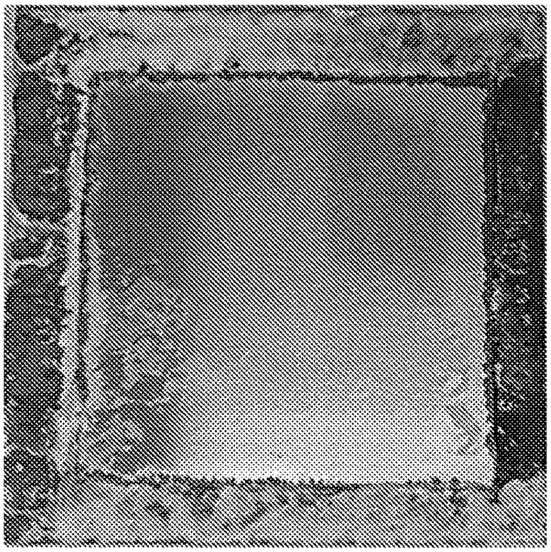
FIG. 4*c* shows an example of an unacceptable amount of adhesive residue after exposing a sample aluminum panel to a salt spray test for 250 hours, based on ASTM D610.

The panel was also visually inspected for the presence of adhesive residue. An example of an unacceptable amount of residue can be seen in FIG. 4. Whether an example has an acceptable (little to none) or unacceptable amount of adhesive residue can be seen in Tables 1 to 3.

Basic Manufacturing Methodology

A polyoxyalkylene polymer, a cross linker, a flame retardant, a tackifier, a stabilizer and an inhibitor are mixed by blade mixer until a homogeneous mixture of polyoxyalkylene adhesive is achieved. In some embodiments, the solid tackifier can be dissolved in polyoxyalkylene polymer and heated before adding other materials. Alternatively, the solid tackifier can be dissolved in a liquid phosphate flame retardant such as tricresyl phosphate, and heated before adding other materials.

The curing reaction of the polyoxyalkylene adhesive is performed by a hydrosilylation of the alkenyl group of the polyoxyalkylene polymer with the hydrosilyl group in the presence of a hydrosilylation catalyst to allow crosslinking to proceed.

The composition comprising the above-described components is cured by heating. That is, the alkenyl group (polyoxyalkylene polymer having at least one alkenyl group in each molecule) is hydrosilylated by the hydrosilyl group (group having Si—H bond) of the compound containing two or more hydrosilyl groups on average in each molecule in the presence of a hydrosilylation catalyst to allow crosslinking to proceed, whereby curing is completed. The cured product is characterized by the ability to exhibit its tacky characteristic (function to adhere to other object) even without addition, or with addition of a small amount, of an adhesiveness-imparting resin. It has low activity, and does not react upon contact with various substances such as water, metal, plastic material and the like. Regarding the heat treatment conditions in this case, it is preferable that the composition be heated at 50 to 200° C. (preferably 100 to 160° C.) for about 0.01 to 24 hours (preferably 0.05 to 4 hours).

The mixture can then be applied to for example, a commonly known coating apparatus such as a gravure coater, a roll coater such as a kiss coater or a comma coater, a die coater such as a slot coater or a fountain coater, a squeeze coater, a curtain coater and the like.

In one embodiment, the mixture is applied to a backing film and then cured. In other embodiments, several layers of mixture may be added onto the backing film, wherein each layer may comprise the same or a different mixture.

Incorporating a Core Film

A mixture is formulated according to the above basic manufacturing methodology, applied to a backing film, and then cured. Then, a core film is laminated on the side of the mixture that is not in communication with the backing film to create composite layer A.

In a separate step, a mixture is formulated according to the above basic manufacturing methodology, applied to a process liner film 11, and then cured to create composite layer B. The mixture used in composite layer B may be the same as or different from that used in composite layer A.

Layer B is laminated onto layer A. The process liner film 11 may be optionally removed by peeling. This results in a final gasket 1, which can be rolled up into a bundle roll if desired.

EXAMPLES

Example 1

A composition containing a polyoxyalkylene polymer as component A, a hydrosilyl compound as component B (in such an amount that the functional group ratio of the amount of hydrosilyl group to the amount of alkenyl group in polyoxyalkylene polymer as component A is 1:2), a hydro silylation catalyst as component C (in an amount corresponding to 0.04 mol per 1 mol of alkenyl group in component A), tricresylphosphate (TCP) as component D (30 parts by weight per 100 parts by weight of component A) and rosin pentaerythritol (20 parts by weight per 100 parts by weight of component A) and ammonium polyphosphate (APP) (50 parts by weight per 100 parts by weight of the total amount of component A) was applied to a sodium etched surface of PTFE film as the adhesive thickness became 450 μm, and heat-treated at 130° C. for 10 min. Thereon was placed double side Na etched PTFE film (50 μm). The same mixture was applied to a release-treated surface of a PET film release sheet, and heat-treated at 130° C. for 10 min, then it was laminated to the Na etched PTFE film surface.

TABLE 1

| Item | | | 1 | 2 | 3 | 4 | 5 |
|---|---|---|---|---|---|---|---|
| Polymer | Polyoxylene adhesive | ACX022 | 100 | 100 | 100 | 100 | 100 |
| Flame retardant | Ammonium polyphosphate | FRCROS 486 | 50 | 50 | 50 | 50 | 50 |
| Flame retardant | Phosphate ester | TCP | 30 | 30 | 30 | 30 | 30 |
| Tackifier | Polymerized rosin | Pencel D125 | 20 | | | 10 | |
| | Terpene phenol | YS polyster S145 | | 20 | | | 5 |
| | Phenol resin | PR-12603 | | | | 10 | 15 |
| | Phenol resin | Tamanol 901 | | | | | |
| | Stabilized rosin ester | Super Ester W115 | | | 20 | | |
| Cross linker | Hydrosilane | CR500 | 2.3 | 2.3 | 2.3 | 5.0 | 5.0 |
| Stabilizer | HALS | Tinuvin 765 | 0.4 | 0.4 | 0.4 | | 0.4 |
| | HALS | Tinuvin 770 | | | | 0.4 | |
| | Triazine UV abs. | Tinuvin 400 | | | | | |
| | Triazole UV abs. | Tinuvin 571 | | | | | |
| | Phenolic anti oxidant | Irganox 245 | | | | | |
| | | Irganox 1010 | | | | | |
| Inhibitor | Alkyne alcohol | MBO | 0.05 | 0.05 | 0.05 | 0.05 | 0.05 |
| Catalyst | Karstedt catalyst | Pt-VTS 0.3% | 1.0 | 1.0 | 1.0 | 1.0 | 1.0 |
| Cure condition | Cure temp. | ° C. | 130 | 130 | 130 | 130 | 130 |
| | Cure time | min | 10 | 10 | 10 | 10 | 10 |
| TF property | Acid value | mgKOH/g | 13 | 1 | 16.6 | 39 | 49 |
| Initial | G' | Pa | 2200 | 3000 | 2000 | 17000 | 17000 |
| 66/80 2 week | | | 2200 | 3000 | 1900 | 7000 | 4000 |
| Corrosion area(250 h) | | % | 0% | 0% | 0% | 3% | 6% |
| Adhesive residue | | — | ○ | ○ | ○ | ○ | ○ |

TABLE 2

| Item | | | 6 | 7 | 8 | 9 | 10 | 11 |
|---|---|---|---|---|---|---|---|---|
| Polymer | Polyoxylene adhesive | ACX022 | 100 | 100 | 100 | 100 | 100 | 100 |
| Flame retardant | Ammonium polyphosphate | FRCROS 486 | 50 | 50 | 50 | 50 | 50 | 50 |
| Flame retardant | Phosphate ester | TCP | 30 | 30 | 30 | 30 | 30 | 30 |
| Tackifier | Polymerized rosin | Pencel D125 | 20 | 20 | 20 | 20 | 20 | 20 |
| | Terpene phenol | YS polyster S145 | | | | | | |
| | Phenol resin | PR-12603 | | | | | | |
| | Phenol resin | Tamanol 901 | | | | | | |
| | Stabilized rosin ester | Super Ester W115 | | | | | | |

TABLE 2-continued

| Item | | | 6 | 7 | 8 | 9 | 10 | 11 |
|---|---|---|---|---|---|---|---|---|
| Cross linker | Hydrosilane | CR500 | 2.3 | 2.7 | 3.1 | 8.0 | 8.0 | 8.0 |
| Stabilizer | HALS | Tinuvin 765 | | 0.4 | 0.4 | 0.4 | | |
| | HALS | Tinuvin 770 | 0.4 | | | | | |
| | Triazine UV abs. | Tinuvin 400 | | | | | | 0.4 |
| | Triazole UV abs. | Tinuvin 571 | | | | | | |
| | Phenolic anti oxidant | Irganox 245 | | | | | | |
| | | Irganox 1010 | | | | | | |
| Inhibitor | Alkvne alcohol | MBO | 0.05 | 0.05 | 0.05 | 0.05 | 0.05 | 0.05 |
| Catalyst | Karstedt catalyst | Pt-VTS 0.3% | 1.0 | 1.0 | 1.0 | 1.0 | 1.0 | 1.0 |
| Cure condition | Cure temp. | ° C. | 130 | 130 | 130 | 130 | 130 | 130 |
| | Cure time | min | 10 | 10 | 10 | 10 | 10 | 10 |
| TF property | Acid value | mgKOH/g | 13 | 13 | 13 | 13 | 13 | 13 |
| Initial | G' | Pa | 2500 | 7000 | 14000 | 22000 | 21000 | 19000 |
| 66/80 2 week | | | 2500 | 7000 | 14000 | 18000 | 100 | 110 |
| Corrosion area(250 h) | | % | 0% | 0% | 0% | 7% | 6% | 6% |
| Adhesive residue | | — | ○ | ○ | ○ | ○ | × | × |

TABLE 3

| Item | | | 12 | 13 | 14 | 15 | 16 | 17 |
|---|---|---|---|---|---|---|---|---|
| Polymer | Polyoxylene adhesive | ACX022 | 100 | 100 | 100 | 100 | 100 | 100 |
| Flame retardant | Ammonium polyphosphate | FRCROS 486 | 50 | 50 | 50 | 50 | 50 | 50 |
| Flame retardant | Phosphate ester | TCP | 30 | 30 | 30 | 30 | 30 | 30 |
| Tackifier | Polymerized rosin | Pencel D125 | 20 | 20 | 20 | | | 20 |
| | Terpene phenol | YS polyster S145 | | | | | | |
| | Phenol resin | PR-12603 | | | | 20 | | |
| | Phenol resin | Tamanol 901 | | | | | 20 | |
| | Stabilized rosin ester | Super Ester W115 | | | | | | |
| Cross linker | Hydrosilane | CR500 | 8.0 | 8.0 | 8.0 | 8.0 | 8.0 | 10 |
| Stabilizer | HALS | Tinuvin 765 | | | | 0.4 | 0.4 | 0.4 |
| | HALS | Tinuvin 770 | | | | | | |
| | Triazine UV abs. | Tinuvin 400 | | | | | | |
| | Triazole UV abs. | Tinuvin 571 | 0.4 | | | | | |
| | Phenolic anti oxidant | Irganox 245 | | 0.4 | | | | |
| | | Irganox 1010 | | | 0.4 | | | |
| Inhibitor | Alkyne alcohol | MBO | 0.05 | 0.05 | 0.05 | 0.05 | 0.05 | 0.05 |
| Catalyst | Karstedt catalyst | Pt-VTS 0.3% | 1.0 | 1.0 | 1.0 | 1.0 | 1.0 | 1.0 |
| Cure condition | Cure temp. | ° C. | 130 | 130 | 130 | 130 | 130 | 130 |
| | Cure time | min | 10 | 10 | 10 | 10 | 10 | 10 |
| TF property | Acid value | mgKOH/g | 13 | 13 | 13 | 65 | 52.4 | 13 |
| Initial | G' | Pa | 21000 | 23000 | 21000 | 23000 | 23000 | 26000 |
| 66/80 2 week | | | 130 | 120 | 150 | 260 | 650 | 26000 |
| Corrosion area(250 h) | | % | 6% | 9% | 7% | 7% | 5% | 15% |
| Adhesive residue | | — | × | × | × | × | × | ○ |

Amount of each component in Tables 1 to 3 was measured in phr units

Adhesive residue: o indicates little to no residue, x indicates unacceptable amount of residue Tables 1 to 3

Examples 1 to 17 were prepared according to Tables 1 to 3. The amount of each type of material (polyoxylene adhesive, ammonium polyphosphate, phosphate ester, polymerized rosin, terpene phenol, phenol resin, stabilized rosin ester, hydrosilane, HALS, triazine UV absorber, phenolic antioxidant, alkylene alcohol, and karstedt catalyst) in each category listed (polymer, flame retardants, tackifiers, cross-linking agents, stabilizers, inhibitor, and catalyst) was measured out in phr units, and each example was manufactured according to the basic manufacturing methodology, curing at 130° C. for 10 minutes. The acidic value of the tackifiers (TF property) were measured in mgKOH/g. The modulus of the adhesive is measured on a dynamic viscoelasticity measuring apparatus, "ARES", manufactured by Rheometrics Co., Ltd. with a sample thickness of about 1.5 mm by using a 7.9 m-diameter parallel plate jig in a shear mode at a frequency of 1 Hz at 40° C. and a distortion of 0.01% and taken as the value of shear storage modulus G' obtained. where for each example an initial modulus was measured and a modulus after storage at 66° C./80% RH for at least 2 weeks was measured. Corrosion testing was carried out on each example for 250 hours at a temperature of 35° C. using a salt solution of 5% NaCl (wt %/wt %), and then the samples were visually inspected to determine the percentage of area that had been corroded. Lastly, samples were then peeled off and inspected for adhesive residue As shown in Tables 1 to 3, the embodiments of the present invention (Examples 1 to 9) are shown to resist corrosion when applied to a metal surface.

Although the embodiments of this invention has been described with a certain degree of particularity, it is to be understood that the present disclosure has been made only by way of illustration and that numerous changes in the details of construction and arrangement of parts may be resorted to without departing from the spirit and the scope of the invention. In addition, while a particular feature may have been disclosed with respect to only one of several implementations, such feature may be combined with one or more other features of the other implementations as may be desired and advantageous for any given or particular application. Thus, the breadth and scope of the subject matter provided in this disclosure should not be limited by any of the above explicitly described embodiments. Rather, the scope should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. Notwithstanding that the numerical ranges and parameters are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. At the very least, and not as an attempt to limit the application of the doctrine of equivalents to the scope of the claims, each numerical parameter should at least be construed in light of the number of reported significant digits and by applying ordinary rounding techniques.

All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. Groupings of alternative elements or embodiments disclosed herein are not to be construed as limitations. Each group member may be referred to and claimed individually or in any combination with other members of the group or other elements found herein. Furthermore, not all illustrated acts or events are required to implement a methodology disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A gel gasket comprising:

at least one pressure sensitive adhesive, a flame-retardant agent, a tackifier, a catalyst, a stabilizer, and an inhibitor, wherein the inhibitor comprises alkyne alcohol;

wherein the at least one pressure sensitive adhesive comprises a polyoxyalkylene adhesive obtained by reacting a monomer or polymer with a cross-linking agent, the cross-linking agent having at least one siloxane bond and at least one reactive functional group, the at least one reactive functional group being a hydrosilyl group;

wherein the amount of the cross-linking agent is in a range of about 2.0 parts to 7.0 parts by weight per 100 parts of the monomer or polymer for the at least one pressure sensitive adhesive;

wherein the flame-retardant agent is a phosphorus flame-retardant agent;

wherein the tackifier has an acid value of less than 50 mg KOH/g;

wherein the catalyst comprises a platinum compound;

wherein the stabilizer is a Brønsted base;

wherein the stabilizer is a hindered amine light stabilizer; and wherein the gel gasket has a storage modulus in the range of 1,000 Pa or more and 25,000 Pa or less after storage at 66° C./80% RH for at least 2 weeks.

2. The gasket of claim 1 wherein the at least one pressure sensitive adhesive comprises a first pressure sensitive adhesive disposed on a backing, the backing selected from the group consisting of polyester, nylon, polyvinyl chloride, polyvinylidene chloride, polyimide, polyamide, polyphenylene sulfide, polyether ether ketone, ionomer, polyolefin, fluororesin, polychlorotrifluoroethylene, polyvinylidene fluoride, polyvinyl fluoride, perfluoroalkoxy fluororesin, tetrafluoroethylene hexafluoropropylene copolymer, ethylene tetrafluoroethylene copolymer, ethylene chlorotrifluoroethylene copolymer, or metal foil.

3. The gasket of claim 2 further comprising a core film.

4. The gasket of claim 3 wherein the at least one pressure sensitive adhesive comprises a second pressure sensitive adhesive disposed on the core film.

5. The gasket of claim 4 wherein the core film is sandwiched between the first pressure sensitive adhesive and the second pressure sensitive adhesive.

6. The gasket of claim 1 wherein the phosphorus flame retardant agent is a phosphate ester or a derivative thereof.

7. The gasket of claim 1 wherein the acid value of the tackifier is less than 40 ng KOH/g.

8. The gasket of claim 1 wherein the flame retardant agent is tricresyl phosphate.

9. The gel gasket of claim 1 wherein the alkyne alcohol is 2-methyl-3-butyn-2-ol.

10. The gel gasket of claim 1, wherein the amount of the cross-linking agent is more than 2.3 parts to about 7.0 parts by weight per 100 parts of the monomer or polymer for the at least one pressure sensitive adhesive.

11. The gel gasket of claim 1, wherein the storage modulus is 1,000 Pa or more and 16,000 Pa or less after storage at 66° C./80% RH for at least 2 weeks.

* * * * *